US010303980B1

(12) United States Patent
Kim et al.

(10) Patent No.: US 10,303,980 B1
(45) Date of Patent: *May 28, 2019

(54) LEARNING METHOD, LEARNING DEVICE FOR DETECTING OBSTACLES AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,681

(22) Filed: Sep. 5, 2018

(51) Int. Cl.
*G06K 9/00* (2006.01)
*G06K 9/62* (2006.01)
*G06N 3/08* (2006.01)
*G06T 7/11* (2017.01)
*G06T 7/70* (2017.01)

(52) U.S. Cl.
CPC ....... *G06K 9/6262* (2013.01); *G06K 9/00805* (2013.01); *G06N 3/084* (2013.01); *G06T 7/11* (2017.01); *G06T 7/70* (2017.01); *G06T 2207/20021* (2013.01)

(58) Field of Classification Search
CPC .. G06N 3/08; G06N 3/02; G06K 9/66; G06K 9/6256; G06K 9/4604; G06K 9/00288; G06K 9/00744; G06K 9/46; G06K 9/6267; G06T 2207/20081; G06T 3/4046; G06T 2207/20084

See application file for complete search history.

(56) References Cited

PUBLICATIONS

Liu, Guangrui. Real-time object detection for autonomous driving-based on deep learning. Diss. 2017. (Year: 2017).*

(Continued)

*Primary Examiner* — Vincent Rudolph
*Assistant Examiner* — Raphael Schwartz
(74) *Attorney, Agent, or Firm* — Xsensus LLP

(57) ABSTRACT

A method for learning parameters of a CNN capable of detecting obstacles in a training image is provided. The method includes steps of: a learning device (a) receiving the training image and instructing convolutional layers to generate encoded feature maps from the training image; (b) instructing the deconvolutional layers to generate decoded feature maps; (c) supposing that each cell of a grid with rows and columns is generated by dividing the decoded feature map with respect to a direction of the rows and the columns, concatenating features of the rows per column in a direction of a channel, to generate a reshaped feature map; (d) calculating losses referring to the reshaped feature map and its GT image in which each row is indicated as corresponding to GT positions where a nearest obstacle is on column from its corresponding lowest cell thereof along the columns; and (e) backpropagating the loss.

30 Claims, 9 Drawing Sheets

(56) References Cited

PUBLICATIONS

Kim, Huieun, et al. "On-road object detection using deep neural network." Consumer Electronics-Asia (ICCE-Asia), IEEE International Conference on. IEEE, 2016. (Year: 2016).*

Gao, Zhi, et al. "Learning a Robust Representation via a Deep Network on Symmetric Positive Definite Manifolds." arXiv preprint arXiv:1711.06540 (2017). (Year: 2017).*

Zhang, Zichen. "Improving Semantic Image Segmentation by Object Localization." (2017). (Year: 2017).*

* cited by examiner

INPUT IMAGE

GROUNG TRUTH (GT)

LEARNING METHOD, LEARNING DEVICE FOR DETECTING OBSTACLES AND TESTING METHOD, TESTING DEVICE USING THE SAME

FIELD OF THE INVENTION

The present invention relates to a method for learning parameters of a CNN capable of detecting one or more obstacles in at least one training image; and more particularly, to the method of (a) receiving the training image and instructing a first to an n-th convolutional layers to respectively and sequentially generate a first encoded feature map to an n-th encoded feature map from the training image; (b) instructing an n-th deconvolutional layer to a first deconvolutional layer to sequentially generate an n-th decoded feature map to a first decoded feature map from the n-th encoded feature map; (c) supposing that each cell of a grid with a plurality of rows and a plurality of columns is generated by dividing the at least one decoded feature map with respect to a first direction by first intervals and with respect to a second direction by second intervals and that the first direction is in a direction of the rows of the at least one decoded feature map and the second direction is in a direction of the columns thereof, concatenating each of features of each of the rows per each of the columns in a direction of a channel, to thereby generate at least one reshaped feature map; (d) calculating at least one loss by referring to the reshaped feature map and its corresponding GT image, wherein the GT image is an image in which each of the rows is indicated as corresponding to each of GT positions where each nearest obstacle is truly located on each of the columns from its corresponding lowest cell thereof along the second direction; and (e) backpropagating the loss, to thereby learn the parameters of the CNN, and a learning device, a testing method, a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a drawing schematically illustrating a conventional process of a general segmentation by using a conventional CNN.

By referring to FIG. 1, according to the conventional lane detection method, a learning device receives an input image, generates feature maps by multiple convolution operations and non-linear operations like ReLU in multiple convolutional layers, and generates a segmentation result by performing multiple deconvolution operations in multiple deconvolutional layers and SoftMax operations on a last of the feature maps.

On the other hand, a conventional method of a lane segmentation has to segment every pixel in the input image, and check every pixel to determine whether the pixel corresponds to a lane or not. Such the conventional method requires tremendous amount of computation caused by checking every pixel, which is clearly a problem.

Meanwhile, when performing the lane segmentation for autonomous vehicles, there is no need for segmentation of all objects within the input image, but detecting only obstacles to the autonomous vehicles should suffice.

Thus a new method for detecting only obstacles within the input image is required.

SUMMARY OF THE INVENTION

It is an object of the present invention to solve all the aforementioned problems.

It is another object of the present invention to provide a new method of detecting obstacles, for autonomous vehicles.

It is still another object of the present invention to provide a method for fast detection of location of the obstacles with less computation, without checking every pixel in an input image.

In accordance with one aspect of the present invention, there is provided a method for learning parameters of a CNN capable of detecting one or more obstacles in at least one training image, including steps of: (a) a learning device receiving the training image and instructing a first to an n-th convolutional layers to respectively and sequentially generate a first encoded feature map to an n-th encoded feature map from the training image; (b) the learning device instructing an n-th deconvolutional layer to a first deconvolutional layer to sequentially generate an n-th decoded feature map to a first decoded feature map from the n-th encoded feature map; (c) the learning device, supposing that each cell of a grid with a plurality of rows and a plurality of columns is generated by dividing the at least one decoded feature map with respect to a first direction by first intervals and with respect to a second direction by second intervals and that the first direction is in a direction of the rows of the at least one decoded feature map and the second direction is in a direction of the columns thereof, concatenating each of features of each of the rows per each of the columns in a direction of a channel, to thereby generate at least one reshaped feature map; (d) the learning device calculating at least one loss by referring to the reshaped feature map and its corresponding GT image, wherein the GT image is an image in which each of the rows is indicated as corresponding to each of GT positions where each nearest obstacle is truly located on each of the columns from its corresponding lowest cell thereof along the second direction; and (e) the learning device backpropagating the loss, to thereby learn the parameters of the CNN.

As one example, at the step of (b), the learning device instructs the n-th deconvolutional layer corresponding to the n-th convolutional layer to generate the n-th decoded feature map by increasing a size, multiplied by a certain number, of the n-th encoded feature map along the first direction.

As one example, the step of (c) further includes a step of: the learning device generating a segmentation result representing each of estimated positions, in the at least one decoded feature map, where said each nearest obstacle is determined as located by checking each of the columns from its corresponding lowest cell thereof along the second direction; and at the step of (d), the loss is generated by referring to the segmentation result and the GT image.

As one example, at the step of (c), the learning device generates the segmentation result by checking each of the estimated positions of each lowest part of each of the obstacles on concatenated channels for each of the columns of the reshaped feature map.

As one example, each of the columns includes one or more pixels in the first direction, and each of the rows includes one or more pixels in the second direction.

As one example, the GT and the segmentation result include information representing on which row each of the obstacles is located among the rows, per each of the columns, resulting from dividing the training image into $N_c$ rows along the second direction, and wherein the reshaped feature map includes $N_c$ channels.

As one example, the reshaped feature map is generated by concatenating, in the direction of the channel, each of the rows resulting from dividing the decoded feature map, per each of the columns.

As one example, the step of (c) includes steps of: (c1) the learning device generating a first reshaped feature map with a size of $C_iH_i \times W_i \times 1$ by using the decoded feature map with a size of $C_i \times W_i \times H_i$, wherein the $C_i$ is the number of the channels, the $W_i$ is a size of the columns, and the $H_i$ is a size of the rows of the decoded feature map; (c2) the learning device performing one or more convolution operations by which the first reshaped feature map with the size of $C_1H_i \times W_i \times 1$ is modified into the first reshaped feature map with a size of $$\left(\frac{W_I}{W_i} \times N_c\right) \times W_i \times 1,$$

wherein the $W_I$ is a column size of the training image and the $W_i$ is the size of the columns of the decoded feature map; (c3) the learning device generating a second reshaped feature map with a size of $N_c \times W_I \times 1$ by using the first reshaped feature map with the size of $$\left(\frac{W_I}{W_i} \times N_c\right) \times W_i \times 1,$$

wherein the $N_c$ is the number of rows into which the training image is divided for specifying where each of the obstacles is located on each of the columns; and (c4) the learning device performing a softmax-outputting process of normalizing the $N_c$ channels for each of the columns of the second reshaped feature map, and at the step of (d), the loss is generated by referring to the GT image and each corresponding softmax output from the step of (c4).

As one example, at the step of (c4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

As one example, the first to the n-th convolutional layers perform at least one operation of convolution, max pooling, and ReLU, to thereby generate one or more reduced feature maps by reducing a size of the training image or any feature map, and wherein the n-th to the first deconvolutional layers perform at least one operation of deconvolution and ReLU, to thereby generate one or more enlarged feature maps by enlarging a size of any feature map inputted.

In accordance with another aspect of the present invention, there is provided a method for testing a CNN capable of detecting one or more obstacles in at least one test image, including steps of: (a) a testing device, on condition that a learning device has (i) received a training image and instructed a first to an n-th convolutional layers to respectively and sequentially generate a first encoded feature map for training to an n-th encoded feature map for training from the training image; (ii) instructed an n-th deconvolutional layer to a first deconvolutional layer to sequentially generate an n-th decoded feature map for training to a first decoded feature map for training from the n-th encoded feature map for training; (iii) supposing that each cell of a grid with a plurality of rows and a plurality of columns has been generated by dividing the at least one decoded feature map for training with respect to a first direction by first intervals and with respect to a second direction by second intervals and that the first direction is in a direction of the rows of the at least one decoded feature map for training and the second direction is in a direction of the columns thereof, concatenated each of features for training of each of the rows per each of the columns in a direction of a channel, to thereby generate at least one reshaped feature map for training; (iv) calculated at least one loss by referring to the reshaped feature map for training and its corresponding GT image, wherein the GT image is an image in which each of the rows is indicated as corresponding to each of GT positions where each nearest obstacle is truly located on each of the columns from its corresponding lowest cell thereof along the second direction; and (v) backpropagated the loss, to thereby learn parameters of the CNN, acquiring at least one test image and instructing the first to the n-th convolutional layers to respectively and sequentially generate a first encoded feature map for testing to an n-th encoded feature map for testing from the test image; (b) the testing device instructing at least one of the deconvolutional layer to generate at least one decoded feature map for testing from the n-th encoded feature map for testing; (c) the testing device concatenating each of features for testing of each of the rows per each of the columns in the direction of the channel, to thereby generate at least one reshaped feature map for testing; and (d) the testing device generating a segmentation result by checking each of estimated positions of each lowest part of each of the obstacles on concatenated channels for each of the columns of the reshaped feature map for testing, to thereby detect the obstacles.

As one example, at the process of (ii), the learning device has instructed the n-th deconvolutional layer corresponding to the n-th convolutional layer to generate the n-th decoded feature map for training by increasing a size, multiplied by a certain number, of the n-th encoded feature map for training along the first direction, and at the step of (b), the testing device instructs the n-th deconvolutional layer to generate the n-th decoded feature map for testing by increasing a size, multiplied by a certain number, of the n-th encoded feature map for testing along the first direction.

As one example, the GT and the segmentation result include information representing on which row each of the obstacles is located among the rows, per each of the columns, resulting respectively from dividing the training image and the test image into $N_c$ rows along the second direction, and the reshaped feature map for training includes $N_c$ channels, and wherein the reshaped feature map for testing includes $N_c$ channels.

As one example, the process of (iii) includes processes of: (iii-1) the learning device having generated a first reshaped feature map for training with a size of $C_iH_i \times W_i \times 1$ by using the decoded feature map for training with a size of $C_i \times W_i \times H_i$, wherein the $C_i$ is the number of the channels, the $W_i$ is a size of the columns, and the $H_i$ is a size of the rows of the decoded feature map for training; (iii-2) the learning device having performed one or more convolution operations by which the first reshaped feature map for training with the size of $C_iH_i \times W_i \times 1$ is modified into the first reshaped feature map for training with a size of $$\left(\frac{W_I}{W_i} \times N_c\right) \times W_i \times 1,$$

wherein the $W_I$ is a column size of the training image and the $W_i$ is the size of the columns of the decoded feature map for training; (iii-3) the learning device having generated a second reshaped feature map for training with a size of $N_c \times W_I \times 1$ by using the first reshaped feature map for training with the size of $$\left(\frac{W_I}{W_i} \times N_c\right) \times W_i \times 1,$$

wherein the $N_c$ is the number of rows into which the training image is divided for specifying where each of the obstacles is located on each of the columns; and (iii-4) the learning device having performed a softmax-outputting process of normalizing the $N_c$ channels for each of the columns of the second reshaped feature map for training, wherein, at the process of (iv), the loss has been generated by referring to the GT image and each corresponding softmax output from the process of (iii-4), and at the step of (c) includes steps of: (c1) the testing device generating a first reshaped feature map for testing with a size of $C_jH_j \times W_j \times 1$ by using the decoded feature map for testing with a size of $C_j \times W_j \times H_j$, wherein the $C_j$ is the number of the channels, the $W_j$ is a size of the columns, and the $H_j$ is a size of the rows of the decoded feature map for testing; (c2) the testing device performing one or more convolution operations by which the first reshaped feature map for testing with the size of $C_jH_j \times W_j \times 1$ is modified into the first reshaped feature map for testing with a size of $$\left(\frac{W_J}{W_j} \times N_c\right) \times W_j \times 1,$$

wherein the $W_J$ is a column size of the test image and the $W_j$ is the size of the columns of the decoded feature map for testing; (c3) the testing device generating a second reshaped feature map for testing with a size of $N_c \times W_J \times 1$ by using the first reshaped feature map for testing with the size of $$\left(\frac{W_J}{W_j} \times N_c\right) \times W_j \times 1,$$

wherein the $N_c$ is the number of rows into which the test image is divided for specifying where each of the obstacles is located on each of the columns; and (c4) the testing device performing a softmax-outputting process of normalizing the $N_c$ channels for each of the columns of the second reshaped feature map for testing.

As one example, at the step of (c4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

In accordance with still another aspect of the present invention, there is provided a learning device for learning parameters of a CNN capable of detecting one or more obstacles in at least one training image, including: a communication part for receiving the training image; and a processor for (i) instructing a first to an n-th convolutional layers to respectively and sequentially generate a first encoded feature map to an n-th encoded feature map from the training image; (ii) instructing an n-th deconvolutional layer to a first deconvolutional layer to sequentially generate an n-th decoded feature map to a first decoded feature map from the n-th encoded feature map; (iii) on condition that each cell of a grid with a plurality of rows and a plurality of columns is generated by dividing the at least one decoded feature map with respect to a first direction by first intervals and with respect to a second direction by second intervals and that the first direction is in a direction of the rows of the at least one decoded feature map and the second direction is in a direction of the columns thereof, concatenating each of features of each of the rows per each of the columns in a direction of a channel, to thereby generate at least one reshaped feature map; (iv) calculating at least one loss by referring to the reshaped feature map and its corresponding GT image, wherein the GT image is an image in which each of the rows is indicated as corresponding to each of GT positions where each nearest obstacle is truly located on each of the columns from its corresponding lowest cell thereof along the second direction; and (v) backpropagating the loss, to thereby learn the parameters of the CNN.

As one example, at the process of (ii), the processor instructs the n-th deconvolutional layer corresponding to the n-th convolutional layer to generate the n-th decoded feature map by increasing a size, multiplied by a certain number, of the n-th encoded feature map along the first direction.

As one example, the process of (iii) further includes a process of: generating a segmentation result representing each of estimated positions, in the at least one decoded feature map, wherein said each nearest obstacle is determined as located by checking each of the columns from its corresponding lowest cell thereof along the second direction; and wherein, at the process of (iv), the loss is generated by referring to the segmentation result and the GT image.

As one example, at the process of (iii), the processor generates the segmentation result by checking each of the estimated positions of each lowest part of each of the obstacles on concatenated channels for each of the columns of the reshaped feature map.

As one example, each of the columns includes one or more pixels in the first direction, and each of the rows includes one or more pixels in the second direction.

As one example, the GT and the segmentation result include information representing on which row each of the obstacles is located among the rows, per each of the columns, resulting from dividing the training image into $N_c$ rows along the second direction, and wherein the reshaped feature map includes $N_c$ channels.

As one example, the reshaped feature map is generated by concatenating, in the direction of the channel, each of the rows resulting from dividing the decoded feature map, per each of the columns.

As one example, the process of (iii) includes processes of: (iii-1) generating a first reshaped feature map with a size of $C_iH_i \times W_i \times 1$ by using the decoded feature map with a size of $C_i \times W_i \times H_i$, wherein the $C_i$ is the number of the channels, the $W_i$ is a size of the columns, and the $H_1$ is a size of the rows of the decoded feature map; (iii-2) the processor performing one or more convolution operations by which the first reshaped feature map with the size of $C_iH_i \times W_i \times 1$ is modified into the first reshaped feature map with a size of $$\left(\frac{W_I}{W_i} \times N_c\right) \times W_i \times 1,$$

wherein the $W_I$ is a column size of the training image and the $W_i$ is the size of the columns of the decoded feature map; (iii-3) the processor generating a second reshaped feature map with a size of $N_c \times W_I \times 1$ by using the first reshaped feature map with the size of $$\left(\frac{W_I}{W_i} \times N_c\right) \times W_i \times 1,$$

wherein the $N_c$ is the number of rows into which the training image is divided for specifying where each of the obstacles is located on each of the columns; and (iii-4) the processor performing a softmax-outputting process of normalizing the $N_c$ channels for each of the columns of the second reshaped feature map, and wherein, at the process of (iv), the loss is generated by referring to the GT image and each corresponding softmax output from the process of (iii-4).

As one example, at the process of (iii-4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

As one example, the first to the n-th convolutional layers perform at least one operation of convolution, max pooling, and ReLU, to thereby generate one or more reduced feature maps by reducing a size of the training image or any feature map, and wherein the n-th to the first deconvolutional layers perform at least one operation of deconvolution and ReLU, to thereby generate one or more enlarged feature maps by enlarging a size of any feature map inputted.

In accordance with still yet another aspect of the present invention, there is provided a testing device for testing a CNN capable of detecting one or more obstacles in at least one test image, including: a communication part for acquiring the test image, on condition that a learning device (i) has received a training image and instructed a first to an n-th convolutional layers to respectively and sequentially generate a first encoded feature map for training to an n-th encoded feature map for training from the training image; (ii) has instructed an n-th deconvolutional layer to a first deconvolutional layer to sequentially generate an n-th decoded feature map for training to a first decoded feature map for training from the n-th encoded feature map for training; (iii) supposing that each cell of a grid with a plurality of rows and a plurality of columns has been generated by dividing the at least one decoded feature map for training with respect to a first direction by first intervals and with respect to a second direction by second intervals and that the first direction is in a direction of the rows of the at least one decoded feature map for training and the second direction is in a direction of the columns thereof, has concatenated each of features for training of each of the rows per each of the columns in a direction of a channel, to thereby generate at least one reshaped feature map for training; (iv) has calculated at least one loss by referring to the reshaped feature map for training and its corresponding GT image, wherein the GT image is an image in which each of the rows is indicated as corresponding to each of GT positions where each nearest obstacle is truly located on each of the columns from its corresponding lowest cell thereof along the second direction; and (v) has backpropagated the loss, to thereby learn parameters of the CNN; and a processor for (I) acquiring the test image and instructing the first to the n-th convolutional layers to respectively and sequentially generate a first encoded feature map for testing to an n-th encoded feature map for testing from the test image; (II) instructing at least one of the deconvolutional layer to generate at least one decoded feature map for testing from the n-th encoded feature map for testing; (III) concatenating each of features for testing of each of the rows per each of the columns in the direction of the channel, to thereby generate at least one reshaped feature map for testing; and (IV) generating a segmentation result by checking each of estimated positions of each lowest part of each of the obstacles on concatenated channels for each of the columns of the reshaped feature map for testing, to thereby detect the obstacles.

As one example, at the process of (ii), the learning device has instructed the n-th deconvolutional layer corresponding to the n-th convolutional layer to generate the n-th decoded feature map for training by increasing a size, multiplied by a certain number, of the n-th encoded feature map for training along the first direction, and at the process of (II), the processor instructs the n-th deconvolutional layer to generate the n-th decoded feature map for testing by increasing a size, multiplied by a certain number, of the n-th encoded feature map for testing along the first direction.

As one example, the GT and the segmentation result include information representing on which row each of the obstacles is located among the rows, per each of the columns, resulting respectively from dividing the training image and the test image into $N_c$ rows along the second direction, and wherein the reshaped feature map for training includes $N_c$ channels, and wherein the reshaped feature map for testing includes $N_c$ channels.

As one example, the process of (iii) includes processes of: (iii-1) the learning device having generated a first reshaped feature map for training with a size of $C_iH_i \times W_i \times 1$ by using the decoded feature map for training with a size of $C_i \times W_i \times H_i$, wherein the $C_i$ is the number of the channels, the $W_i$ is a size of the columns, and the $H_i$ is a size of the rows of the decoded feature map for training; (iii-2) the learning device having performed one or more convolution operations by which the first reshaped feature map for training with the size of $C_iH_i \times W_i \times 1$ is modified into the first reshaped feature map for training with a size of $$\left(\frac{W_I}{W_i} \times N_c\right) \times W_i \times 1,$$

wherein the $W_I$ is a column size of the training image and the $W_i$ is the size of the columns of the decoded feature map for training; (iii-3) the learning device having generated a second reshaped feature map for training with a size of $N_c \times W_I \times 1$ by using the first reshaped feature map for training with the size of $$\left(\frac{W_I}{W_i} \times N_c\right) \times W_i \times 1,$$

wherein the $N_c$ is the number of rows into which the training image is divided for specifying where each of the obstacles is located on each of the columns; and (iii-4) the learning device having performed a softmax-outputting process of normalizing the $N_c$ channels for each of the columns of the second reshaped feature map for training, wherein, at the process of (iv), the loss has been generated by referring to the GT image and each corresponding softmax output from the process of (iii-4), and wherein the process of (III) includes process of: (III-1) generating a first reshaped feature map for testing with a size of $C_jH_j \times W_j \times 1$ by using the decoded feature map for testing with a size of $C_j \times W_j \times H_j$, wherein the $C_j$ is the number of the channels, the $W_j$ is a size of the columns, and the $H_j$ is a size of the rows of the decoded feature map for testing; (III-2) performing one or more convolution operations by which the first reshaped feature map for testing with the size of $C_jH_j \times W_j \times 1$ is modified into the first reshaped feature map for testing with a size of $$\left(\frac{W_J}{W_j} \times N_c\right) \times W_j \times 1,$$

wherein the $W_J$ is a column size of the test image and the $W_j$ is the size of the columns of the decoded feature map for testing; (III-3) generating a second reshaped feature map for testing with a size of $N_c \times W_J \times 1$ by using the first reshaped feature map for testing with the size of $$\left(\frac{W_J}{W_j} \times N_c\right) \times W_j \times 1,$$

wherein the $N_c$ is the number of rows into which the test image is divided for specifying where each of the obstacles is located on each of the columns; and (III-4) performing a softmax-outputting process of normalizing the $N_c$ channels for each of the columns of the second reshaped feature map for testing.

As one example, at the process of (III-4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
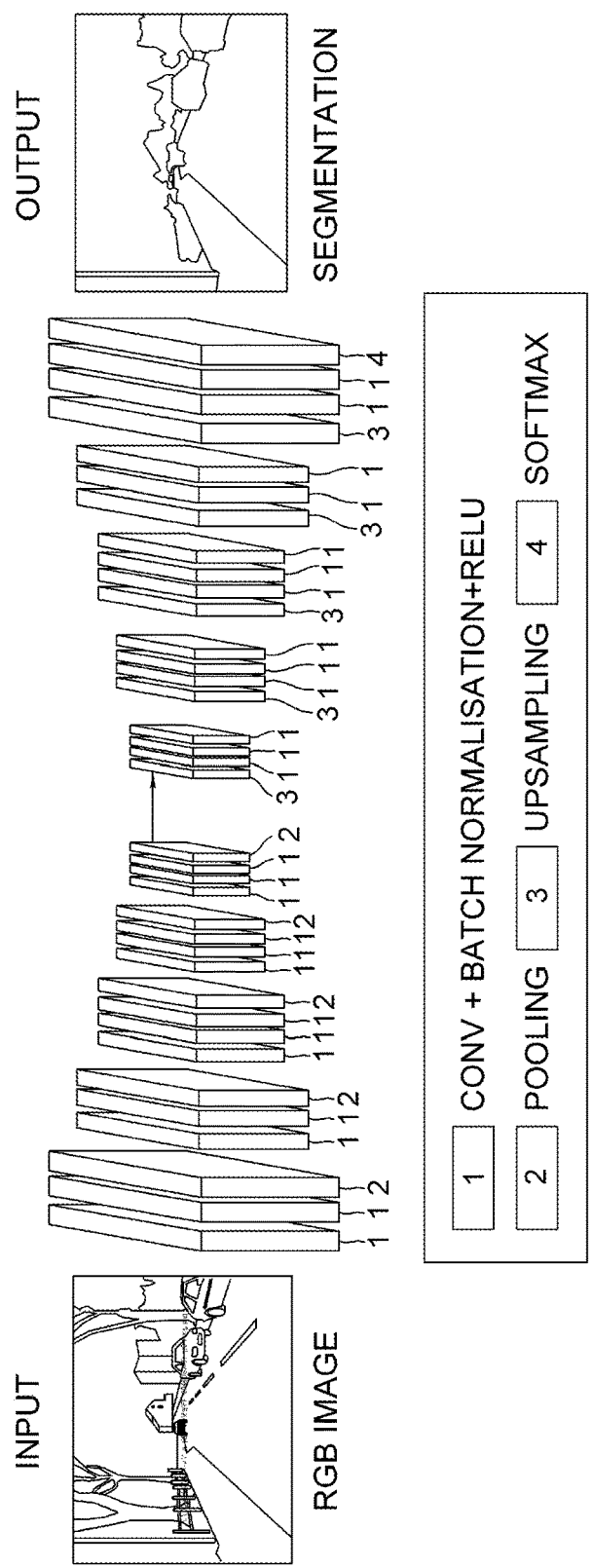
FIG. 1 is a drawing schematically illustrating a conventional process of a general segmentation by using a conventional CNN.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

The present invention provides an algorithm capable of detecting obstacles fast with less computation in a high-resolution image. It is an object of detecting the obstacles in accordance with the present invention to identify at least one boundary between a road and at least one obstacle in an input image. Supposing that a direction of rows of the input image is a first direction, and that the direction of columns of the input image is a second direction, the first direction may be divided by first intervals to form multiple columns, and the second direction may be divided by second intervals to form multiple rows, and thus a grid may be generated. Using information on the rows for each of the columns where each nearest obstacle is determined as located by checking each of the columns starting from its corresponding lowest cell of the grid along the second direction, locations of the obstacles on a road may be detected. Also, the present invention reduces computational load by (i) a learning process with multi-loss using high-resolution information and (ii) a testing process using low-resolution features only.

Figure 2:
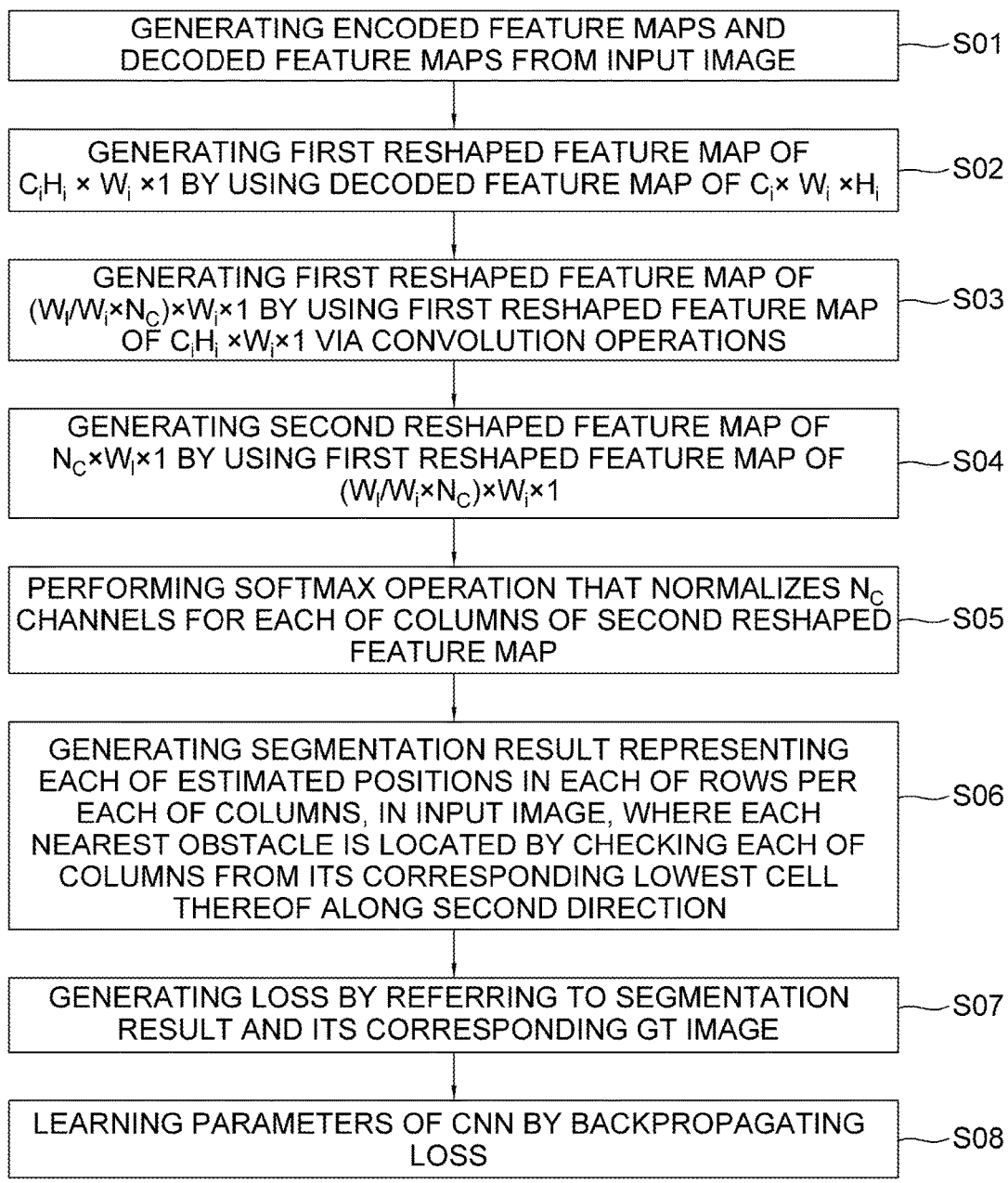
FIG. 2 is a flow chart schematically illustrating a learning method of a CNN for detecting obstacles in accordance with the present invention.
Figure 3:
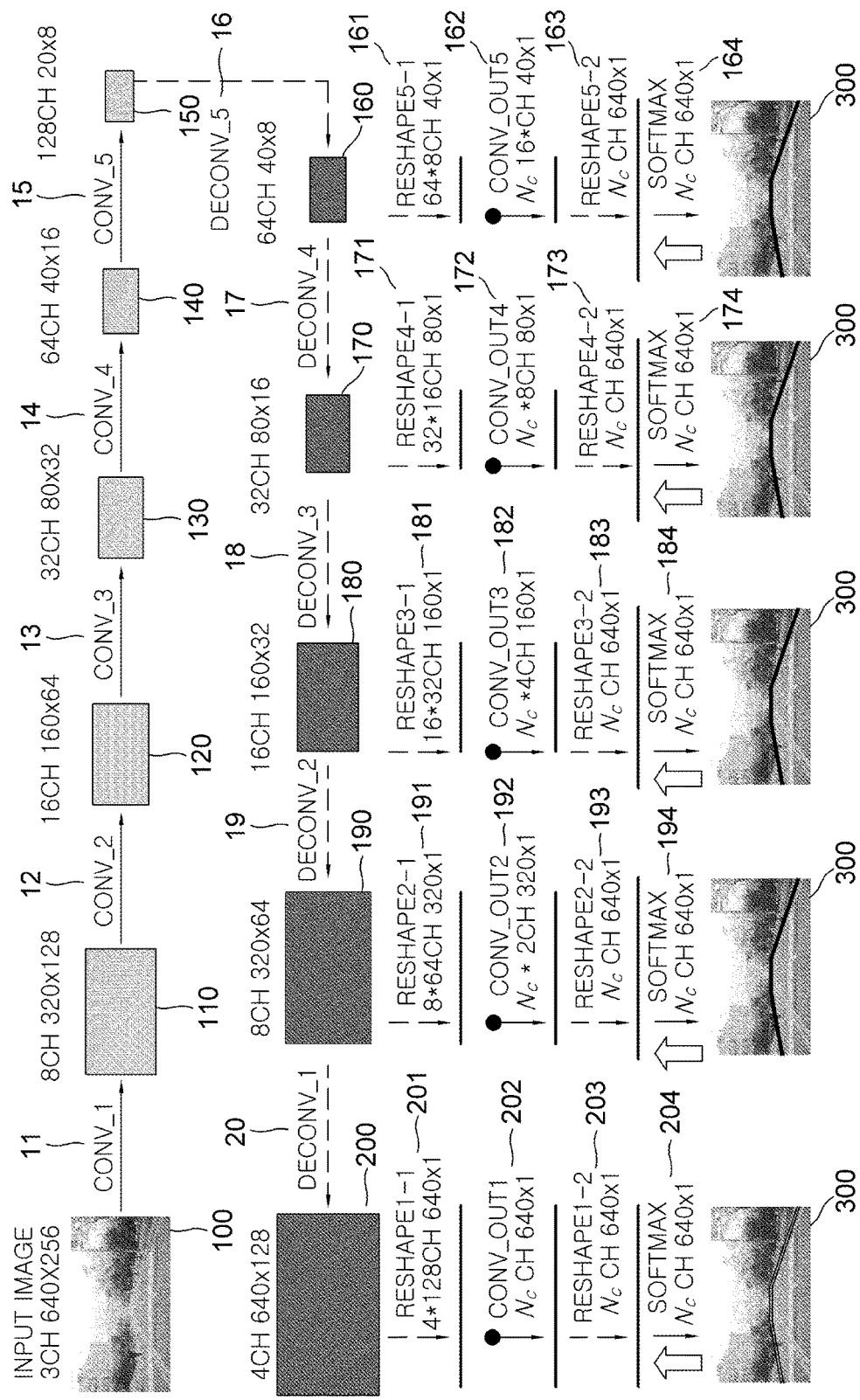
FIG. 3 is a drawing exemplary illustrating operations on an input image to describe the learning method of the CNN for detecting the obstacles in accordance with the present invention.

FIG. 2 is a flow chart schematically illustrating a learning method of a CNN for detecting the obstacles in accordance with the present invention. FIG. 3 is a drawing exemplary illustrating operations on the input image to describe the learning method of the CNN for detecting the obstacles in accordance with the present invention.

By referring to FIGS. 2 and 3, processes of the learning method of the CNN for detecting the obstacles in accordance with the present invention is described in detail as follows.

A process of detecting the obstacles in accordance with the present invention may start with a step S01 of generating encoded feature maps and decoded feature maps from at least one input image. At the step of S01, if a learning device receives the input image as a training image, the learning device may instruct a first to an n-th convolutional layers to respectively and sequentially generate a first encoded feature map to an n-th encoded feature map from the training image, where the CNN for detecting the obstacles may include the first to the n-th convolutional layers. Further, the CNN for detecting the obstacles may include an n-th to a first deconvolutional layers corresponding to the first to the n-th convolutional layers, and the learning device may instruct the n-th to the first deconvolutional layers to respectively and sequentially generate an n-th decoded feature map to a first decoded feature map from the n-th encoded feature map.

For example, by referring to FIG. 3, the CNN for detecting the obstacles may include the first convolutional layer 11 to a fifth convolutional layer 15 and a fifth deconvolutional layer 16 to the first deconvolutional layer 20, and the learning device may receive the training image 100 having a size of 640×256 with 3 ch. This training image is inputted into the first convolutional layer 11 which may generate the first encoded feature map 110 having a size of 320×128 with 8 ch, the second convolutional layer 12 which may generate the second encoded feature map 120 having a size of 160×64 with 16 ch, the third convolutional layer 13 which may generate the third encoded feature map 130 having a size of 80×32 with 32 ch, the fourth convolutional layer 14 which may generate the fourth encoded feature map 140 having a size of 40×16 with 64 ch, and the fifth convolutional layer 15 which may generate the fifth encoded feature map 150 having a size of 20×8 with 128 ch.

As such, the convolutional layers may increase channels of the input image or the feature maps, and may reduce their horizontal and vertical sizes, to thereby generate the encoded feature maps. For example, the second convolutional layer 12 to the fifth convolutional layer 15 may double the channels of the inputted feature map and may reduce its horizontal and vertical sizes in half, to thereby generate the encoded feature maps.

Meanwhile, the learning device may instruct the n-th deconvolutional layer corresponding to the n-th convolutional layer to increase a horizontal size of the n-th encoded feature map by a multiplier to thereby generate the n-th decoded feature map. For example, by referring to FIG. 3, the learning device may instruct the fifth deconvolutional layer 16 to generate the fifth decoded feature map 160 having a size of 40×8 with 64 ch from the fifth encoded feature map 150 having a size of 20×8 with 128 ch.

In general, a deconvolutional layer reduces the number of channels and increases horizontal and vertical sizes, however, the n-th deconvolutional layer in accordance with the present invention reduces the number of the channels of the n-th encoded feature map and increases the horizontal size by the multiplier, e.g., two for doubling, but keeps the vertical size of the feature map. The reason is that, as aforementioned, determining which position has the highest score among the columns of the grid is enough for the present invention. That is, the present invention does not need to check every pixel, unlike a conventional segmentation, nor has need for increase of the vertical size. The present invention provides a method that horizontal resolutions of input and output are the same, thus, does not have a problem of lowering of horizontal resolution according to conventional techniques. Although a high vertical resolution is preferred, that will require too much computational load. Therefore, the present invention proposes a method that only the horizontal resolution is increased to detect the obstacles with less computation. For this purpose, as aforementioned, the n-th deconvolutional layer may reduce the number of the channels of the n-th encoded feature map, and may increase the horizontal size by the multiplier, e.g., two for doubling, but does not change the vertical size.

Describing the process of decoding by referring to FIG. 3 again, the learning device may instruct the fourth deconvolutional layer 17 to generate the fourth decoded feature map 170 having a size of 80×16 with 32 ch from the fifth decoded feature map 160 having a size of 40×8 with 64 ch, the third deconvolutional layer 18 to generate the third decoded feature map 180 having a size of 160×32 with 16 ch from the fourth decoded feature map 170 having a size of 80×16 with 32 ch, the second deconvolutional layer 19 to generate the second decoded feature map 190 having a size of 320×64 with 8 ch from the third decoded feature map 180 having a size of 160×32 with 16 ch, and the first deconvolutional layer 20 to generate the first decoded feature map 200 having a size of 640×128 with 4 ch from the second decoded feature map 190 having a size of 320×64 with 8 ch.

Thus, the deconvolutional layers may reduce the number of feature maps inputted, and may increase the horizontal and the vertical sizes, to thereby generate the decoded feature maps. For example, the fourth deconvolutional layer 17 to the first deconvolutional layer 20 may reduce the number of the channels in half and may double each of the horizontal and the vertical sizes of the inputted feature map, to thereby generate the decoded feature maps.

Meanwhile, the convolutional layers may perform at least one operation of convolution, max pooling, and ReLU, and the deconvolutional layers may perform at least one operation of deconvolution and ReLU.

Then, by referring to FIG. 2, the learning device may generate a first reshaped feature map with a size of $C_iH_i \times W_i \times 1$ by using the decoded feature map with a size of $C_i \times W_i \times H_i$, where the $C_i$ is the number of the channels, the $W_i$ is a size of the columns, and the $H_i$ is a size of the rows of the decoded feature map at a step S02.

That is, at a reshaping process in accordance with the present invention, supposing that each cell of the grid with a plurality of rows and a plurality of columns is generated by dividing the at least one decoded feature map with respect to the first direction by the first intervals and with respect to the second direction by the second intervals, the learning device may concatenate each of features of each of the rows per each of the columns in the direction of the channel, to thereby generate at least one reshaped feature map.

Figure 4:
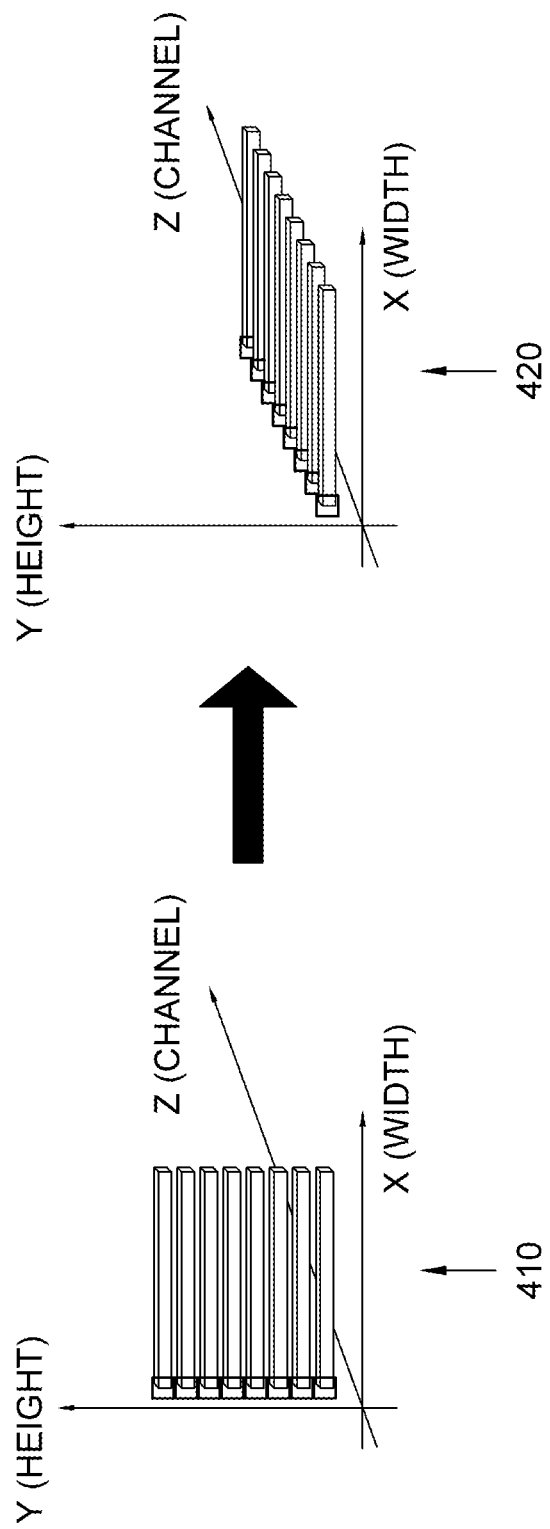
FIG. 4 is a drawing schematically illustrating a reshaping process for detecting the obstacles in accordance with the present invention.

FIG. 4 is a drawing schematically illustrating a reshaping process for detecting the obstacles in accordance with the present invention.

By referring to FIG. 4, at the reshaping process, a decoded feature map may be divided into rows as in the illustrated feature map 410, and each of the features of each of the rows per each of the columns may be concatenated in the direction of the channel as in the illustrated feature map 420. Thus, a feature map with a size of (C×W×H) may be converted into a feature map with a size of ((C*H)×W×1).

In the example of FIG. 4, each square with thick lines on the feature map 410 represents each feature in each row corresponding to the first column of the decoded feature map. Such features in each row are concatenated for each column in the direction of the channel. If the feature map 410 has 8 rows, the feature map 420 may have eight times the number of the channels and an eighth of the height of the feature map 410.

In the example of FIG. 3, the fifth decoded feature map 160 having a size of 40×8 with 64 ch may be converted to the first reshaped feature map 161 having a size of 40×1 with 64*8 ch by a first reshaping process, i.e., RESHAPE 5-1, the fourth decoded feature map 170 having a size of 80×16 with 32 ch may be converted to the first reshaped feature map 171 having a size of 80×1 with 32*16 ch by a first reshaping process, i.e., RESHAPE 4-1, the third decoded feature map 180 having a size of 160×32 with 16 ch may be converted to the first reshaped feature map 181 having a size of 160×1 with 16*32 ch by a first reshaping process, i.e., RESHAPE 3-1, the second decoded feature map 190 having a size of 320×64 with 8 ch may be converted to the first reshaped feature map 191 having a size of 320×1 with 8*64 ch by a first reshaping process, i.e., RESHAPE 2-1, and the first decoded feature map 200 having a size of 640×128 with 4 ch may be converted to the first reshaped feature map 201 having a size of 640×1 with 4*128 ch by a first reshaping process, i.e., RESHAPE 1-1.

For reference, although the first reshaping process is illustrated in FIG. 3 as performed on every decoded feature map, it is not a requirement that every decoded feature map be reshaped, therefore, reshaping a part of the decoded feature maps should suffice.

Then, at a step of S03, the first reshaped feature map with a size of $C_i H_i \times W_i \times 1$ may be converted to the first reshaped feature map with a size of $$\left(\frac{W_I}{W_i} \times N_c\right) \times W_i \times 1,$$

by the convolution operations. Herein, the $W_I$ is a column size of the training image and the $W_i$ is the size of the columns of the decoded feature map. The convolution operation is a 1×1 convolution, whose operands are cells in the grid which range over all of the channels but over just one unit horizontally and vertically, to find out where each of the lowest parts of the obstacles is positioned in each of $N_c$ columns of each first reshaped feature map, where $N_c$ is the number the second direction of the input image is divided into. All information on the decoded feature maps along the column direction has been integrated into the channels, for simultaneous operations on all the information, at the first reshaping process, therefore, the convolution operation makes it possible to check all pieces of information on the channels, to thereby find out where each of the lowest parts of each of the obstacles is positioned for each column.

Clearly, in case of the example of the fifth decoded feature map 160, the first reshaping operation and the 1×1 convolution operation may be performed simultaneously if an 8×1 convolution without reshaping is performed. That is, if a height of a specific feature map is N, N×1 convolution may be used. However, in general, the 1×1 convolution operation is implemented on hardware for quick calculation, although an 8×1 kernel or N×1 kernel, which is rarely used, is very slow on calculation. Therefore, it is more effective to separate the reshaping operation and the 1×1 convolution operation.

By referring to a result of the 1×1 convolution operation, if the column size of the inputted feature map is $W_i$ and the column size of the original image is $W_I$, the inputted feature map may be converted to have channels of $$\frac{W_I}{W_i} \times N_c.$$

In the example of FIG. 3, the first reshaped feature map 161 having a size of 40×1 with 64*8 ch of the fifth decoded feature map may be converted to the first reshaped feature map 162 having a size of 40×1 with $N_c$*16 ch by the 1×1 convolution operation, the first reshaped feature map 171 having a size of 80×1 with 32*16 ch of the fourth decoded feature map may be converted to the first reshaped feature map 172 having a size of 80×1 with N:*8 ch by the 1×1 convolution operation, the first reshaped feature map 181 having a size of 160×1 with 16*32 ch of the third decoded feature map may be converted to the first reshaped feature map 182 having a size of 160×1 with $N_c$*4 ch by the 1×1 convolution operation, the first reshaped feature map 191 having a size of 320×1 with 8*64 ch of the second decoded feature map may be converted to the first reshaped feature map 192 having a size of 320×1 with $N_c$*3 ch by the 1×1 convolution operation, and the first reshaped feature map 201 having a size of 640×1 with 4*128 ch of the first decoded feature map may be converted to the first reshaped feature map 202 having a size of 640×1 with $N_c$ ch by the 1×1 convolution operation.

By referring to FIG. 2 again, at a step of S04, the first reshaped feature map having a size of $$\left(\frac{W_I}{W_i} \times N_c\right) \times W_i \times 1$$

may be converted to a second reshaped feature map having a size of $N_c \times W_I \times 1$. Herein, the $N_c$ is the number of the rows into which the second direction of the input image is divided for specifying where each of the obstacles is located on each of the columns.

Then at a step of S05, a softmax operation is performed that normalizes values of the $N_c$ channels for each of the columns of the second reshaped feature map, and at a step of S06, the segmentation result is generated representing each of estimated positions in each of the rows, per each of the columns in the input image, where said each nearest obstacle is determined as located by checking each of the columns from its corresponding lowest cell thereof along the second direction.

At the step of S04, i.e., the second reshaping process, the outputted feature map having a size of $$\left(\frac{W_I}{W_i} \times N_c\right) \times W_i \times 1$$

may be modified to have a size of $N_c \times W_I \times 1$, with its data fixed but only its shape changed. At the step of S05, i.e., the softmax process, the values of the $N_c$ channels per column may be normalized so that their values fall between 0 and 1, then each position of each obstacle per each of the columns may be found out by searching each specific channel with each corresponding highest value by referring to the normalized values.

Accordingly, feature maps may be generated by the 1×1 convolution operation at the step of S03 and the reshaping operation at the step of S04, such that each of the estimated positions of the each lowest part of the obstacles among the rows per each of the columns may be allowed to have each corresponding highest value, and the rest of positions, i.e., the rest of rows, among the rows per each of the columns may be allowed to have lower values. The softmax operation at the step of S05 may be used for finding each largest value among each of the $N_c$ values for each column of the input image then outputting it, to thereby locate each of the positions of each of the obstacles. Then, if each lowest part of each of the obstacles is determined as present in each specific channel with each corresponding highest value among values of the channels per each of the columns by referring to the normalized values, the segmentation result may be generated such that each of the estimated positions of the each lowest part of the obstacles among the rows per each of the columns has each corresponding highest value and the rest of positions among the rows per each of the columns have lower values, among the $N_c$ rows.

To understand this process, one needs to understand the shape of a final result, i.e., a result of the softmax operation. The desired output from the learning method of the CNN may be finding each row with each corresponding highest value among the $N_c$ rows for each of the columns in the input image as the position of the obstacles. In order to do so, $N_c$ scores per column may be required. If the number, i.e., the width of the input image, of the columns in the input image is 640, i.e., 640 pixels or 640 columns, then a score map having a size of $N_c$ (channel)×640(width)×1(height) may be calculated as an output.

The process of generating the score map having a size of $N_c$ (channel)×640(width)×1(height) as the output is as follows. For example, if the first reshaped feature map 161 having a size of 512(64*8) (channel)×40 (width)×1 (height) of the fifth decoded feature map by the first reshaping process, i.e., RESHAPE 5-1, is generated, this first reshaped feature map may have forty columns, only a sixteenth of those of the input image. Thus, in this case, sixteen $N_c$ output scores generated from sixteen times of the 1×1 convolution operations may suffice. Therefore, the size of the output 162 from CONV_OUT5 in FIG. 3 must be designed to be ($N_c$*16) (channel)×40 (width)×1 (height). Then, the second reshaping process, i.e., RESHAPE 5-2, may be needed to convert the score map having a size of (N*16) (channel)×40 (width)×1 (height) to the scope map having a size of $N_c$ (channel)×640(width)×1(height).

By referring to the example in FIG. 3, the feature map 162 having a size of 40×1 with $N_c$*16 ch may be converted to the feature map 163 having a size of 640×1 with $N_c$ ch by the 1×1 convolution, i.e., CONV_OUT5, and an output 164 is generated such that each of the estimated positions of the each lowest part of each obstacle among the rows per each of the columns has each corresponding highest value, and that the rest of positions among the rows per each of the columns have lower values, among the $N_c$ rows per each column of 640 by the softmax operation. Then, the feature map 172 having a size of 80×1 with $N_c$*8 ch, the feature map 182 having a size of 160×1 with $N_c$*4 ch, the feature map 192 having a size of 320×1 with $N_c$*2 ch, and the feature map 202 having a size of 640×1 with $N_c$ ch are respectively converted to each of the feature maps 173, 183, 193, and 203 having a size of 640×1 with $N_c$ ch by each of the 1×1 convolution operations of CONV_OUT4 to CONV_OUT1, and then each of outputs 174, 184, 194, and 204 is generated such that each of the estimated positions of the each lowest part of the obstacles among the rows per each of the columns has each corresponding highest value, and that the rest of the positions among the rows per each of the columns have lower values, among the $N_c$ rows per each column of 640 by the softmax operation.

That is, the learning device may generate the segmentation result representing each of the estimated positions, in the at least one decoded feature map, where said each nearest obstacle is determined as located by checking each of the columns from its corresponding lowest cell thereof along the second direction, i.e., upwards. The learning device may generate the segmentation result by checking each of the estimated positions of each lowest part of each of the obstacles on concatenated channels for each of the columns of the reshaped feature map.

By referring to FIG. 2 again, at least one loss may be generated by referring to the segmentation result and its corresponding at least one GT image at a step of S07, and parameters of the CNN may be learned or optimized by backpropagating the loss at a step of S08.

Figure 5:
FIG. 5 is a drawing exemplary illustrating the input image and its corresponding GT image for detecting the obstacles in accordance with the present invention.
Figure 5:

Herein, the GT image may be an image in which each of the rows is indicated as corresponding to each of GT positions where each nearest obstacle is truly located on each of the columns from its corresponding lowest cell thereof along the second direction, i.e., upwards. FIG. 5 is a drawing exemplarily illustrating the input image and its corresponding GT image for detecting the obstacles in accordance with the present invention. By referring to FIG. 5, the GT image may be generated by designating a nearest object as the obstacle when checking from the bottom to the top per each column, i.e., per column acquired by dividing 640 pixels by the first intervals or per each pixel of the 640 pixels, in the input image. Because the GT image and the segmentation result include information representing on which row each of the obstacles is located among the $N_c$ rows, per each of the columns in the input image, all of the reshaped feature maps 164, 174, 184, 194, and 204 resulting from reshaping the decoded feature map may be generated as having the $N_c$ channels.

The loss at the step of S07 may be a cross-entropy loss. The loss may be backpropagated for learning or optimizing of the parameters of the CNN. In the example of FIG. 3, outputs are generated by using five decoded feature maps and thus five losses are generated, however, the backpropagation may be performed by referring to the loss and the outputs from at least part of the five decoded feature maps. Especially, although it is preferable that the loss be used which is generated by referring to the first decoded feature map outputted from the first convolutional layer 20, it is not a requirement.

On condition that the parameters of the CNN have been learned via the above processes, a testing device using the CNN with the learned parameters may detect obstacles from at least one test image as the input image.

Figure 6:
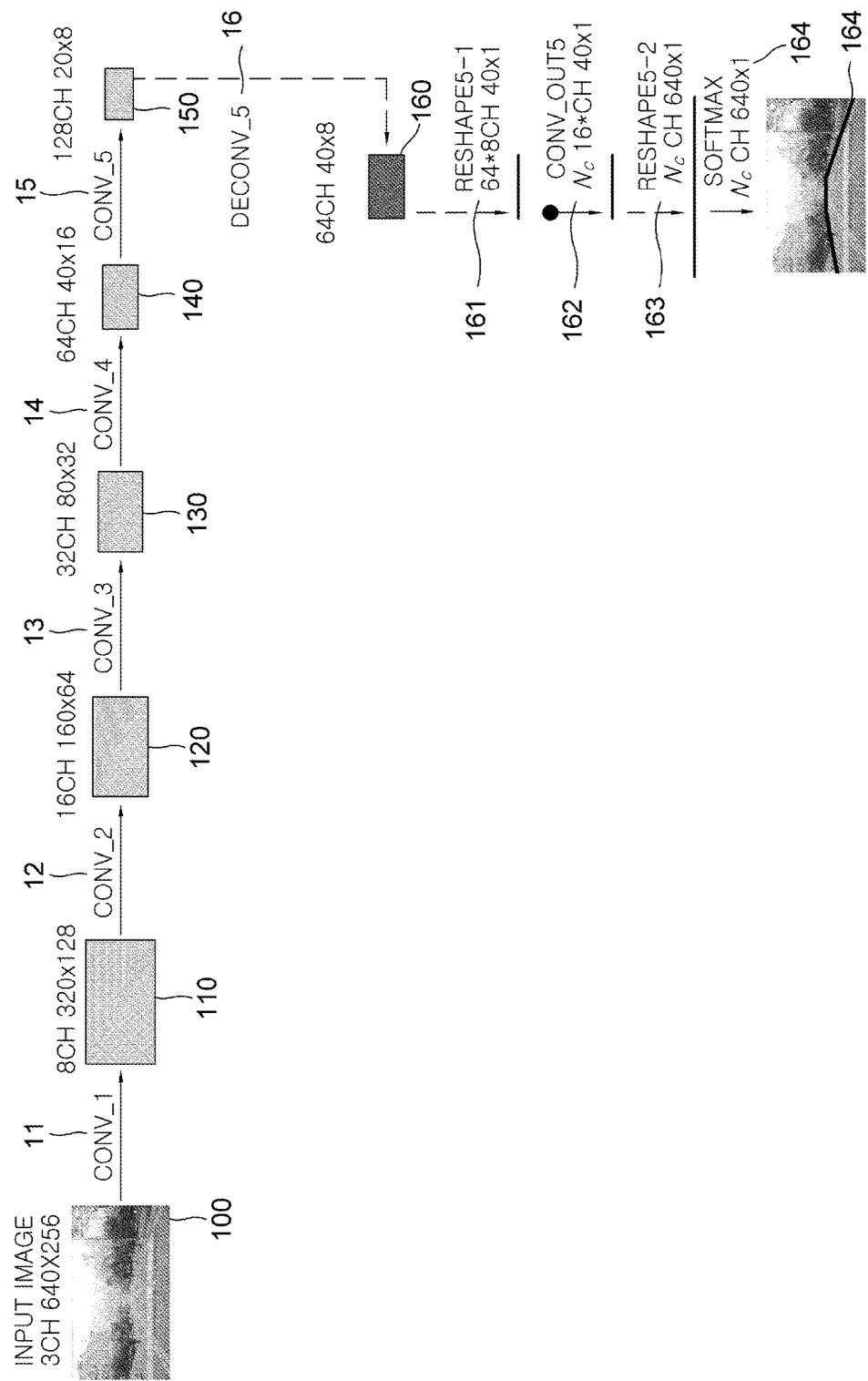
FIG. 6 is a drawing exemplary illustrating operations on the input image to describe a testing method of the CNN for detecting the obstacles in accordance with the present invention.

FIG. 6 is a drawing exemplarily illustrating operations on the input image to describe a testing method of the CNN for detecting the obstacles in accordance with the present invention. By referring to FIG. 6, unlike the learning device in FIG. 3, a single output suffices, and the fourth deconvolutional layer to the first deconvolutional layer may be omitted because the output may be directly generated using the fifth decoded feature map. As another example, some of the omitted deconvolutional layers may be included.

Detailed explanation of the processes is similar to the description by referring to FIG. 3, thus detecting the obstacles by referring to FIG. 6 is briefly described as follows. First, the testing device may receive the test image 100 and may instruct the first to the n-th convolutional layers 11 to 15 to respectively and sequentially generate a first encoded feature map for testing to an n-th encoded feature map for testing 110, 120, 130, 140, and 150 from the test image 100. Then, the testing device may instruct at least one deconvolutional layer 16 to generate a decoded feature map 160 for testing from the n-th encoded feature map 150 for testing. Then, a reshaped feature map 161 for testing may be generated by concatenating, in a direction of the channel, each of features of each of the rows per each of the columns arranged in the second direction, by referring to the grid, from the decoded feature map 160 for testing. Then, a feature map 162 for testing with channels changed by the 1×1 convolution operations and additional reshaping processes, and a feature map 163 for testing with its channels changed to $N_c$ and the horizontal number of its columns changed to the horizontal number of the test image are generated. Then, the testing device may generate a segmentation result 164 for testing by checking each of the estimated positions of each lowest part of the obstacles among the rows per each of the columns on concatenated channels per each of the columns of the reshaped feature map for testing, to thereby detect the obstacles.

Figure 7A:
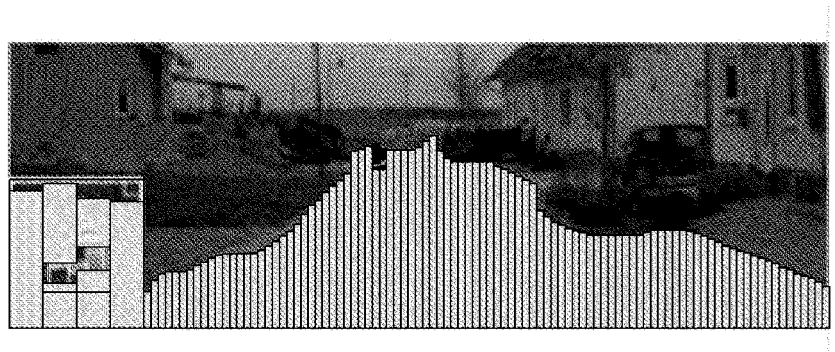
FIG. 7A is a drawing schematically illustrating a result of a conventional object detection.
Figure 7B:
FIGS. 7B and 7C are drawings schematically illustrating a result of object detection in accordance with the present invention.
Figure 7C:

FIG. 7A is a drawing schematically illustrating a result of the conventional object detection. FIGS. 7B and 7C are drawings schematically illustrating the result of the object detection in accordance with the present invention.

FIG. 7A illustrates an example of detecting the obstacles according to the conventional method, which has to check every pixel to determine whether the pixel corresponds to the lane or not, and as a result, its computational load is heavy. However, FIGS. 7B and 7C illustrate the method in accordance with the present invention which detects the obstacles by checking the grid cells of a certain number, e.g., $N_c$, from the bottom to the top of an image to determine positions where the obstacles are first detected as located, as indicated in green, and as a result, the obstacles in a high-resolution image are quickly detected with less computation.

Further, the conventional method has a problem that the horizontal resolution of the detection result is lower than the resolution of the input image due to time required for its processing, however, the method in accordance with the present invention resolves this problem because the horizontal resolutions of the input image and the output result are the same.

Additionally, the present invention may utilize high-resolution information when learning by using multi-loss, then in a real-world test, high-resolution outputs are generated using only low-resolution feature maps. Therefore, less computation and quick processing are achieved by outputting high-resolution information from the low-resolution feature maps.

As can be understood by those skilled in the art, it is clear that communication parts of the learning device and the testing device may perform transmission of image data, for example, images described above like a training image, an input image, and an input image for testing, etc., that processors and/or memories of the learning device and the testing device may retain data for feature maps and performing operations, and that the processors of the learning device and the testing device may perform convolution operations, deconvolution operations, and loss value operations, but the scope of the present invention is not limited thereto.

The present invention has an effect of determining paths for the autonomous vehicles by detecting where the obstacles are positioned in the columns on an x-axis of the grid generated by dividing the input image by certain intervals.

The present invention has another effect of detecting the obstacles with less computation, without checking every pixel in the input image.

The present invention has still another effect of reducing computational load by outputting high-resolution information from low-resolution features.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning parameters of a CNN capable of detecting one or more obstacles in at least one training image, comprising steps of:
   (a) a learning device receiving the training image and instructing a first to an n-th convolutional layers to respectively and sequentially generate a first encoded feature map to an n-th encoded feature map from the training image;
   (b) the learning device instructing an n-th deconvolutional layer to a first deconvolutional layer to sequentially generate an n-th decoded feature map to a first decoded feature map from the n-th encoded feature map;
   (c) the learning device, wherein each cell of a grid with a plurality of rows and a plurality of columns is generated by dividing the at least one decoded feature map with respect to a first direction by first intervals and with respect to a second direction by second intervals and that the first direction is in a direction of the rows of the at least one decoded feature map and the second direction is in a direction of the columns thereof, concatenating each of features of each of the rows per each of the columns in a direction of a channel, to thereby generate at least one reshaped feature map;
   (d) the learning device calculating at least one loss by referring to the reshaped feature map and its corresponding GT image, wherein the GT image is an image in which each of the rows is indicated as corresponding to each of GT positions where each nearest obstacle is truly located on each of the columns from its corresponding lowest cell thereof along the second direction; and
   (e) the learning device backpropagating the loss, to thereby learn the parameters of the CNN.

2. The method of claim 1, wherein, at the step of (b), the learning device instructs the n-th deconvolutional layer corresponding to the n-th convolutional layer to generate the n-th decoded feature map by increasing a size, multiplied by a certain number, of the n-th encoded feature map along the first direction.

3. The method of claim 1, wherein the step of (c) further includes a step of: the learning device generating a segmentation result representing each of estimated positions, in the at least one decoded feature map, where said each nearest obstacle is determined as located by checking each of the columns from its corresponding lowest cell thereof along the second direction; and
   wherein, at the step of (d), the loss is generated by referring to the segmentation result and the GT image.

4. The method of claim 3, wherein, at the step of (c), the learning device generates the segmentation result by checking each of the estimated positions of each lowest part of each of the obstacles on concatenated channels for each of the columns of the reshaped feature map.

5. The method of claim 1, wherein each of the columns includes one or more pixels in the first direction, and each of the rows includes one or more pixels in the second direction.

6. The method of claim 1, wherein the GT and the segmentation result include information representing on which row each of the obstacles is located among the rows, per each of the columns, resulting from dividing the training image into $N_c$ rows along the second direction, and wherein the reshaped feature map includes $N_c$ channels.

7. The method of claim 1, wherein, the reshaped feature map is generated by concatenating, in the direction of the channel, each of the rows resulting from dividing the decoded feature map, per each of the columns.

8. The method of claim 7, wherein the step of (c) includes steps of:
   (c1) the learning device generating a first reshaped feature map with a size of $C_i H_i \times W_i \times 1$ by using the decoded feature map with a size of $C_i \times W_i \times H_i$, wherein the $C_i$ is the number of the channels, the $W_i$ is a size of the columns, and the $H_i$ is a size of the rows of the decoded feature map;
   (c2) the learning device performing one or more convolution operations by which the first reshaped feature map with the size of $C_i H_i \times W_i \times 1$ is modified into the first reshaped feature map with a size of $$\left(\frac{W_I}{W_i} \times N_c\right) \times W_i \times 1,$$

wherein the $W_I$ is a column size of the training image and the $W_i$ is the size of the columns of the decoded feature map;
   (c3) the learning device generating a second reshaped feature map with a size of $N_c \times W_I \times 1$ by using the first reshaped feature map with the size of $$\left(\frac{W_I}{W_i} \times N_c\right) \times W_i \times 1,$$

wherein the $N_c$ is the number of rows into which the training image is divided for specifying where each of the obstacles is located on each of the columns; and
   (c4) the learning device performing a softmax-outputting process of normalizing the $N_c$ channels for each of the columns of the second reshaped feature map, and
   wherein, at the step of (d), the loss is generated by referring to the GT image and each corresponding softmax output from the step of (c4).

9. The method of claim 8, wherein, at the step of (c4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

10. The method of claim 1, wherein the first to the n-th convolutional layers perform at least one operation of convolution, max pooling, and ReLU, to thereby generate one or more reduced feature maps by reducing a size of the training image or any feature map, and wherein the n-th to the first deconvolutional layers perform at least one operation of deconvolution and ReLU, to thereby generate one or more enlarged feature maps by enlarging a size of any feature map inputted.

11. A method for testing a CNN capable of detecting one or more obstacles in at least one test image, comprising steps of:
   (a) a testing device, on condition that a learning device has (i) received a training image and instructed a first to an n-th convolutional layers to respectively and sequentially generate a first encoded feature map for training to an n-th encoded feature map for training from the training image; (ii) instructed an n-th deconvolutional layer to a first deconvolutional layer to sequentially generate an n-th decoded feature map for training to a first decoded feature map for training from the n-th encoded feature map for training; (iii) wherein each cell of a grid with a plurality of rows and a plurality of columns has been generated by dividing the at least one decoded feature map for training with respect to a first direction by first intervals and with respect to a second direction by second intervals and that the first direction is in a direction of the rows of the at least one decoded feature map for training and the second direction is in a direction of the columns thereof, concatenated each of features for training of each of the rows per each of the columns in a direction of a channel, to thereby generate at least one reshaped feature map for training; (iv) calculated at least one loss by referring to the reshaped feature map for training and its corresponding GT image, wherein the GT image is an image in which each of the rows is indicated as corresponding to each of GT positions where each nearest obstacle is truly located on each of the columns from its corresponding lowest cell thereof along the second direction; and (v) backpropagated the loss, to thereby learn parameters of the CNN, acquiring at least one test image and instructing the first to the n-th convolutional layers to respectively and sequentially generate a first encoded feature map for testing to an n-th encoded feature map for testing from the test image;
(b) the testing device instructing at least one of the deconvolutional layer to generate at least one decoded feature map for testing from the n-th encoded feature map for testing;
(c) the testing device concatenating each of features for testing of each of the rows per each of the columns in the direction of the channel, to thereby generate at least one reshaped feature map for testing; and
(d) the testing device generating a segmentation result by checking each of estimated positions of each lowest part of each of the obstacles on concatenated channels for each of the columns of the reshaped feature map for testing, to thereby detect the obstacles.

12. The method of claim 11, wherein, at the process of (ii), the learning device has instructed the n-th deconvolutional layer corresponding to the n-th convolutional layer to generate the n-th decoded feature map for training by increasing a size, multiplied by a certain number, of the n-th encoded feature map for training along the first direction, and
at the step of (b), the testing device instructs the n-th deconvolutional layer to generate the n-th decoded feature map for testing by increasing a size, multiplied by a certain number, of the n-th encoded feature map for testing along the first direction.

13. The method of claim 11, wherein the GT and the segmentation result include information representing on which row each of the obstacles is located among the rows, per each of the columns, resulting respectively from dividing the training image and the test image into $N_c$ rows along the second direction, and
wherein the reshaped feature map for training includes $N_c$ channels, and wherein the reshaped feature map for testing includes $N_c$ channels.

14. The method of claim 11, wherein the process of (iii) includes processes of:
(iii-1) the learning device having generated a first reshaped feature map for training with a size of $C_i H_i \times W_i \times 1$ by using the decoded feature map for training with a size of $C_i \times W_i \times H_i$, wherein the $C_i$ is the number of the channels, the $W_i$ is a size of the columns, and the $H_i$ is a size of the rows of the decoded feature map for training;
(iii-2) the learning device having performed one or more convolution operations by which the first reshaped feature map for training with the size of $C_i H_i \times W_i \times 1$ is modified into the first reshaped feature map for training with a size of $$\left(\frac{W_I}{W_i} \times N_c\right) \times W_i \times 1,$$

wherein the $W_I$ is a column size of the training image and the $W_i$ is the size of the columns of the decoded feature map for training;
(iii-3) the learning device having generated a second reshaped feature map for training with a size of $N_c \times W_I \times 1$ by using the first reshaped feature map for training with the size of $$\left(\frac{W_I}{W_i} \times N_c\right) \times W_i \times 1,$$

wherein the $N_c$ is the number of rows into which the training image is divided for specifying where each of the obstacles is located on each of the columns; and
(iii-4) the learning device having performed a softmax-outputting process of normalizing the $N_c$ channels for each of the columns of the second reshaped feature map for training,
wherein, at the process of (iv), the loss has been generated by referring to the GT image and each corresponding softmax output from the process of (iii-4), and
wherein the step of (c) includes steps of:
(c1) the testing device generating a first reshaped feature map for testing with a size of $C_j H_j \times W_j \times 1$ by using the decoded feature map for testing with a size of $C_j \times W_j \times H_j$, wherein the $C_j$ is the number of the channels, the $W_j$ is a size of the columns, and the $H_j$ is a size of the rows of the decoded feature map for testing;
(c2) the testing device performing one or more convolution operations by which the first reshaped feature map for testing with the size of $C_j H_j \times W_j \times 1$ is modified into the first reshaped feature map for testing with a size of $$\left(\frac{W_J}{W_j} \times N_c\right) \times W_j \times 1,$$

wherein the $W_J$ is a column size of the test image and the $W_j$ is the size of the columns of the decoded feature map for testing;
(c3) the testing device generating a second reshaped feature map for testing with a size of $N_c \times W_J \times 1$ by using the first reshaped feature map for testing with the size of $$\left(\frac{W_J}{W_j} \times N_c\right) \times W_j \times 1,$$

wherein the $N_c$ is the number of rows into which the test image is divided for specifying where each of the obstacles is located on each of the columns; and (c4) the testing device performing a softmax-outputting process of normalizing the $N_c$ channels for each of the columns of the second reshaped feature map for testing.

15. The method of claim 14, wherein, at the step of (c4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

16. A learning device for learning parameters of a CNN capable of detecting one or more obstacles in at least one training image, comprising:

a processor for (i) instructing a first to an n-th convolutional layers to respectively and sequentially generate a first encoded feature map to an n-th encoded feature map from a training image; (ii) instructing an n-th deconvolutional layer to a first deconvolutional layer to sequentially generate an n-th decoded feature map to a first decoded feature map from the n-th encoded feature map; (iii) on condition that each cell of a grid with a plurality of rows and a plurality of columns is generated by dividing the at least one decoded feature map with respect to a first direction by first intervals and with respect to a second direction by second intervals and that the first direction is in a direction of the rows of the at least one decoded feature map and the second direction is in a direction of the columns thereof, concatenating each of features of each of the rows per each of the columns in a direction of a channel, to thereby generate at least one reshaped feature map; (iv) calculating at least one loss by referring to the reshaped feature map and its corresponding GT image, wherein the GT image is an image in which each of the rows is indicated as corresponding to each of GT positions where each nearest obstacle is truly located on each of the columns from its corresponding lowest cell thereof along the second direction; and (v) backpropagating the loss, to thereby learn the parameters of the CNN.

17. The learning device of claim 16, wherein, at the process of (ii), the processor instructs the n-th deconvolutional layer corresponding to the n-th convolutional layer to generate the n-th decoded feature map by increasing a size, multiplied by a certain number, of the n-th encoded feature map along the first direction.

18. The learning device of claim 16, wherein the process of (iii) further includes a process of: generating a segmentation result representing each of estimated positions, in the at least one decoded feature map, wherein said each nearest obstacle is determined as located by checking each of the columns from its corresponding lowest cell thereof along the second direction; and wherein, at the process of (iv), the loss is generated by referring to the segmentation result and the GT image.

19. The learning device of claim 18, wherein, at the process of (iii), the processor generates the segmentation result by checking each of the estimated positions of each lowest part of each of the obstacles on concatenated channels for each of the columns of the reshaped feature map.

20. The learning device of claim 16, wherein each of the columns includes one or more pixels in the first direction, and each of the rows includes one or more pixels in the second direction.

21. The learning device of claim 16, wherein the GT and the segmentation result include information representing on which row each of the obstacles is located among the rows, per each of the columns, resulting from dividing the training image into $N_c$ rows along the second direction, and wherein the reshaped feature map includes $N_c$ channels.

22. The learning device of claim 16, wherein, the reshaped feature map is generated by concatenating, in the direction of the channel, each of the rows resulting from dividing the decoded feature map, per each of the columns.

23. The learning device of claim 22, wherein the process of (iii) includes processes of: (iii-1) generating a first reshaped feature map with a size of $C_i H_i \times W_i \times 1$ by using the decoded feature map with a size of $C_i \times W_i \times H_i$, wherein the $C_i$ is the number of the channels, the $W_i$ is a size of the columns, and the $H_i$ is a size of the rows of the decoded feature map; (iii-2) performing one or more convolution operations by which the first reshaped feature map with the size of $C_i H_i \times W_i \times 1$ is modified into the first reshaped feature map with a size of $$\left(\frac{W_I}{W_i} \times N_c\right) \times W_i \times 1,$$

wherein the $W_I$ is a column size of the training image and the $W_i$ is the size of the columns of the decoded feature map; (iii-3) generating a second reshaped feature map with a size of $N_c \times W_I \times 1$ by using the first reshaped feature map with the size of $$\left(\frac{W_I}{W_i} \times N_c\right) \times W_i \times 1,$$

wherein the $N_c$ is the number of rows into which the training image is divided for specifying where each of the obstacles is located on each of the columns; and (iii-4) performing a softmax-outputting process of normalizing the $N_c$ channels for each of the columns of the second reshaped feature map, and wherein, at the process of (iv), the loss is generated by referring to the GT image and each corresponding softmax output from the process of (iii-4).

24. The learning device of claim 23, wherein, at the process of (iii-4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

25. The learning device of claim 16, wherein the first to the n-th convolutional layers perform at least one operation of convolution, max pooling, and ReLU, to thereby generate one or more reduced feature maps by reducing a size of the training image or any feature map, and wherein the n-th to the first deconvolutional layers perform at least one operation of deconvolution and ReLU, to thereby generate one or more enlarged feature maps by enlarging a size of any feature map inputted.

26. A testing device for testing a CNN capable of detecting one or more obstacles in at least one test image, comprising:
a processor configured to
(I) process the test image after a learning device (i) has received a training image and instructed a first to an n-th convolutional layers to respectively and sequentially generate a first encoded feature map for training to an n-th encoded feature map for training from the training image; (ii) has instructed an n-th deconvolutional layer to a first deconvolutional layer to sequentially generate an n-th decoded feature map for training to a first decoded feature map for training from the n-th encoded feature map for training; (iii) wherein each cell of a grid with a plurality of rows and a plurality of columns has been generated by dividing the at least one decoded feature map for training with respect to a first direction by first intervals and with respect to a second direction by second intervals and that the first direction is in a direction of the rows of the at least one decoded feature map for training and the second direction is in a direction of the columns thereof, has concatenated each of features for training of each of the rows per each of the columns in a direction of a channel, to thereby generate at least one reshaped feature map for training; (iv) has calculated at least one loss by referring to the reshaped feature map for training and its corresponding GT image, wherein the GT image is an image in which each of the rows is indicated as corresponding to each of GT positions where each nearest obstacle is truly located on each of the columns from its corresponding lowest cell thereof along the second direction; and (v) has backpropagated the loss, to thereby learn parameters of the CNN;
(II) acquire the test image and instruct the first to the n-th convolutional layers to respectively and sequentially generate a first encoded feature map for testing to an n-th encoded feature map for testing from the test image;
(III) instruct at least one of the deconvolutional layer to generate at least one decoded feature map for testing from the n-th encoded feature map for testing;
(IV) concatenate each of features for testing of each of the rows per each of the columns in the direction of the channel, to thereby generate at least one reshaped feature map for testing; and
(V) generate a segmentation result by checking each of estimated positions of each lowest part of each of the obstacles on concatenated channels for each of the columns of the reshaped feature map for testing, to thereby detect the obstacles.

27. The testing device of claim 26, wherein, at the process of (ii), the learning device has instructed the n-th deconvolutional layer corresponding to the n-th convolutional layer to generate the n-th decoded feature map for training by increasing a size, multiplied by a certain number, of the n-th encoded feature map for training along the first direction, and
at the process of (II), the processor instructs the n-th deconvolutional layer to generate the n-th decoded feature map for testing by increasing a size, multiplied by a certain number, of the n-th encoded feature map for testing along the first direction.

28. The testing device of claim 26, wherein the GT and the segmentation result include information representing on which row each of the obstacles is located among the rows, per each of the columns, resulting respectively from dividing the training image and the test image into $N_c$ rows along the second direction, and wherein the reshaped feature map for training includes $N_c$ channels, and wherein the reshaped feature map for testing includes $N_c$ channels.

29. The testing device of claim 26, wherein the process of (iii) includes processes of:
(iii-1) the learning device having generated a first reshaped feature map for training with a size of $C_iH_i \times W_i \times 1$ by using the decoded feature map for training with a size of $C_i \times W_i \times H_i$, wherein the $C_i$ is the number of the channels, the $W_i$ is a size of the columns, and the $H_i$ is a size of the rows of the decoded feature map for training;
(iii-2) the learning device having performed one or more convolution operations by which the first reshaped feature map for training with the size of $C_iH_i \times W_i \times 1$ is modified into the first reshaped feature map for training with a size of $$\left(\frac{W_I}{W_i} \times N_c\right) \times W_i \times 1,$$

wherein the $W_I$ is a column size of the training image and the $W_i$ is the size of the columns of the decoded feature map for training;
(iii-3) the learning device having generated a second reshaped feature map for training with a size of $N_c \times W_I \times 1$ by using the first reshaped feature map for training with the size of $$\left(\frac{W_I}{W_i} \times N_c\right) \times W_i \times 1,$$

wherein the $N_c$ is the number of rows into which the training image is divided for specifying where each of the obstacles is located on each of the columns; and
(iii-4) the learning device having performed a softmax-outputting process of normalizing the $N_c$ channels for each of the columns of the second reshaped feature map for training,
wherein, at the process of (iv), the loss has been generated by referring to the GT image and each corresponding softmax output from the process of (iii-4), and
wherein the process of (III) includes processes of:
(III-1) generating a first reshaped feature map for testing with a size of $C_jH_j \times W_j \times 1$ by using the decoded feature map for testing with a size of $C_j \times W_j \times H_j$, wherein the $C_j$ is the number of the channels, the $W_j$ is a size of the columns, and the $H_j$ is a size of the rows of the decoded feature map for testing;
(III-2) performing one or more convolution operations by which the first reshaped feature map for testing with the size of $C_jH_j \times W_j \times 1$ is modified into the first reshaped feature map for testing with a size of $$\left(\frac{W_J}{W_j} \times N_c\right) \times W_j \times 1,$$

wherein the $W_j$ is a column size of the test image and the $W_j$ is the size of the columns of the decoded feature map for testing;

(III-3) generating a second reshaped feature map for testing with a size of $N_c \times W_j \times 1$ by using the first reshaped feature map for testing with the size of $$\left(\frac{W_J}{W_j} \times N_c\right) \times W_j \times 1,$$

wherein the $N_c$ is the number of rows into which the test image is divided for specifying where each of the obstacles is located on each of the columns; and (III-4) performing a softmax-outputting process of normalizing the $N_c$ channels for each of the columns of the second reshaped feature map for testing.

30. The learning device of claim 29, wherein, at the process of (III-4), if each lowest part of each of the obstacles is determined as present in each specific channel with each corresponding highest value among the channels for each of the columns, the segmentation result is generated such that each of the estimated positions of the each lowest part in each of the rows is allowed to have each corresponding highest value and positions in other rows among the rows are allowed to have lower values, among $N_c$ rows.

* * * * *